J. CONCEIÇÃO.
EXTERMINATOR.
APPLICATION FILED JAN. 30, 1917.
1,245,685.
Patented Nov. 6, 1917.
2 SHEETS—SHEET 1.
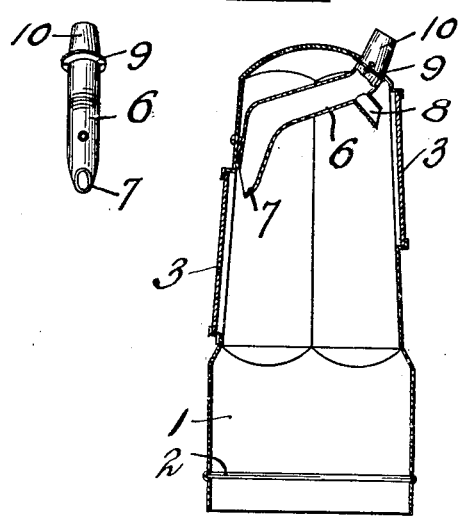
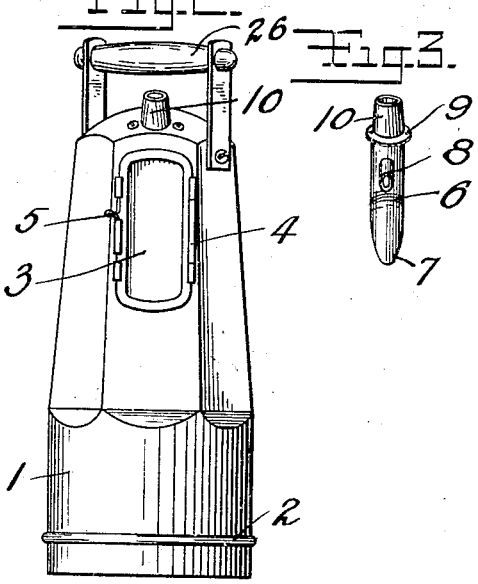
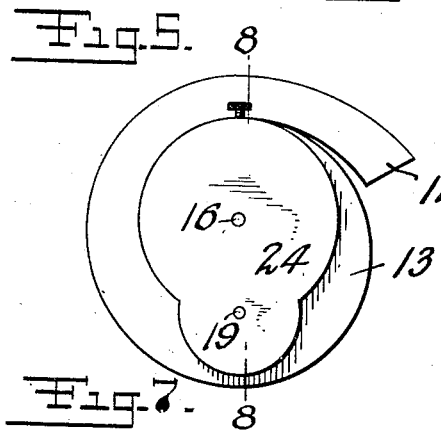
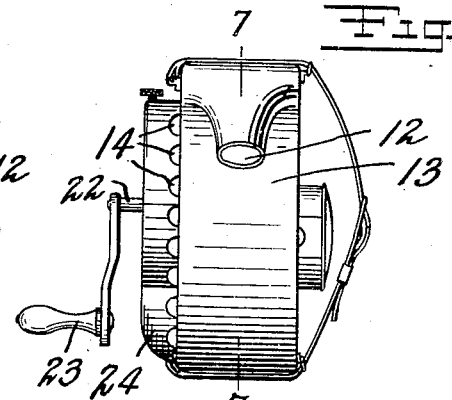
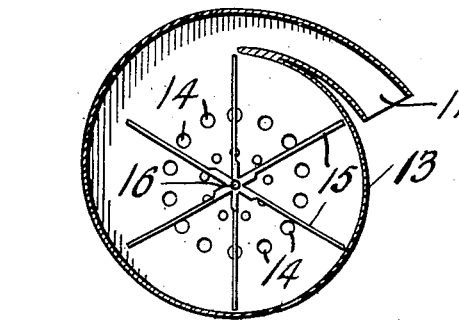
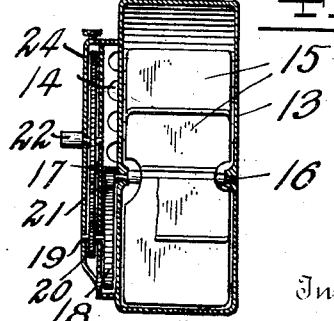
Inventor
JULIO CONCEIÇÃO
By his Attorney J. CONCEIÇÃO.
EXTERMINATOR.
APPLICATION FILED JAN. 30, 1917.
1,245,685.
Patented Nov. 6, 1917.
2 SHEETS—SHEET 2.
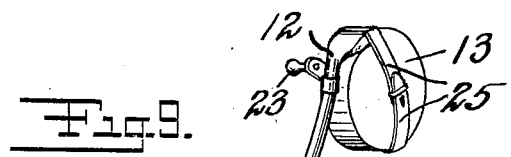
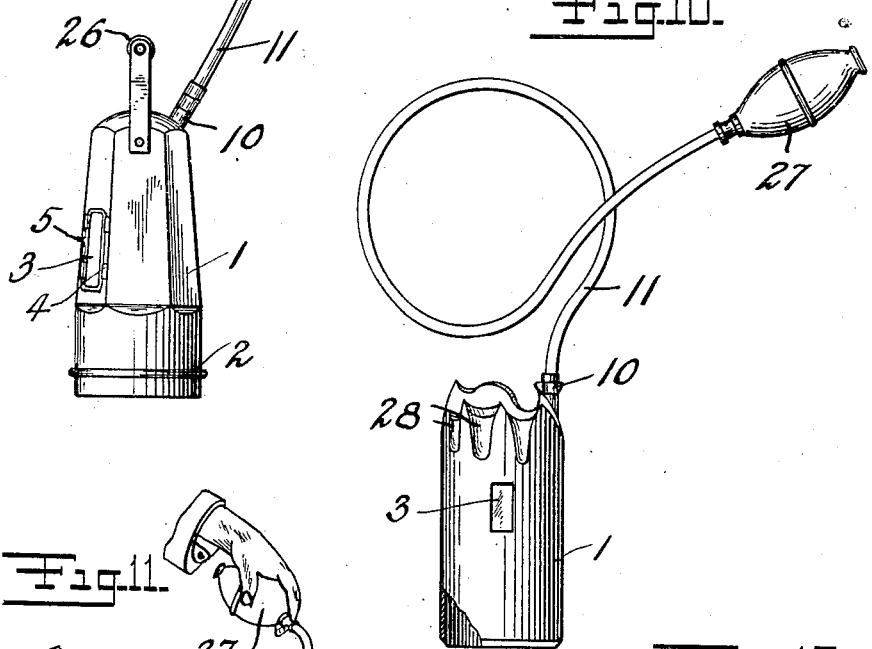
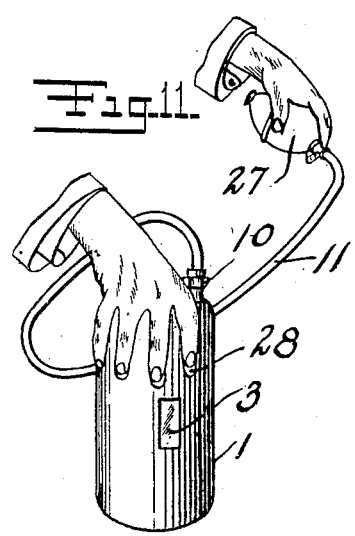
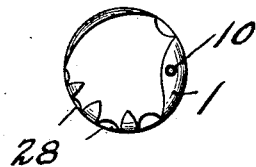
Inventor
JULIO CONCEIÇÃO
By his Attorney

UNITED STATES PATENT OFFICE.

JULIO CONCEIÇÃO, OF SANTOS, BRAZIL.

EXTERMINATOR.

1,245,685.  Specification of Letters Patent.  Patented Nov. 6, 1917.

Application filed January 30, 1917. Serial No. 145,451.

*To all whom it may concern:*

Be it known that I, JULIO CONCEIÇÃO, a citizen of Brazil, residing at Santos, State of St. Paulo, Brazil, have invented new and useful Improvements in Exterminators, of which the following is a specification.

My invention relates to exterminators.

The object of my invention is to provide an apparatus for applying a gaseous or liquid insecticide to the soil. A more specific object is to provide a construction which will permit the operator to observe the application of the insecticide and to effectively confine the same to a particular area under treatment.

My invention consists of the construction, combination and arrangement of parts, as herein illustrated, described and claimed.

In the accompanying drawings, forming part hereof, I have illustrated a form of embodiment of my invention, in which drawings similar reference characters designate corresponding parts, and in which:

Figure 1 is a vertical section;

Fig. 2 is a side elevation;

Fig. 3 is a plan view of a fluid distributing device;

Fig. 4 is another view of a fluid distributing device;

Fig. 5 is a side elevation of a pressure varying element;

Fig. 6 is an edge elevation of the pressure varying element;

Fig. 7 is a section taken through the pressure varying element approximately on a line 7—7 of Fig. 6;

Fig. 8 is a section taken approximately on a line 8—8 of Fig. 5;

Fig. 9 is a perspective view showing the application of the implement;

Fig. 10 is a perspective of a slightly modified form;

Fig. 11 is a perspective graphically illustrating the application of the implement; and, Fig. 12 is a plan view of the casing with the conveying element omitted.

Referring to the drawings, 1 designates a bell-shaped casing, having an annular rim 2, adjacent its mouth, so that when the casing is forced into the soil a tight joint will be formed.

The wall of the casing 1 is provided with a plurality of openings covered by transparent members 3, attached by hinges 4 and having a suitable securing device 5 coöperating with the edge of the openings in the casing. The object of these transparent sections is to permit the operator to view the inside of the casing to observe the effect of the treatment and of the operation going on inside of the casing.

A bent tube 6 is disposed in the upper end of the casing 1 and has its lower end 7 and a branch 8 terminating adjacent the transparent sections 3. Adjacent this upper end the tube 6 is provided with an annular rib which abuts against the wall of the suitable opening in the top of the casing so as to leave a projecting nipple 10. Connected with the nipple 10 is a flexible connecting member 11, and the opposite end of which is secured to the mouth 12 of a casing 13. The casing 13 is provided with openings 14 and has therein a fan 15 disposed on a shaft 16. Outside of the casing the shaft 16 has secured thereon a pinion 17 disposed to mesh with a gear 18 disposed on a sub shaft 19 and carrying a pinion 20. The pinion 20 is disposed to mesh with a gear 21 on a shaft 22, the latter of which is arranged to be rotated by a crank 23. A suitable outside casing 24 surrounds the parts 17 to 23 inclusive.

A flexible, two part adjustable member 25 is secured to one side of the casing 13 in order to give the operator a firm grasp of the apparatus, with one hand, while the crank 23 is being turned with the other hand.

To facilitate the forcing of the lower edge of the casing 1 into the soil an upper handle 26 is provided.

In Figs. 10 to 12 inclusive a simpler modified form of construction is illustrated. In this latter form a bulb 27 is provided at the end of a flexible member 11 and in place of the handle 26, shown in the first figures of the drawings, the top of the casing 1 is provided with a plurality of depressions or serrations in conformity with the contour of the human hand, by means of which a firm grip is afforded on the top of the casing 1.

In the operation of the apparatus gas is produced inside of the casing 1 in any suitable manner and thereupon the crank 23 is rotated or the bulb 27 is compressed and pressure is produced inside of the casing 1 forcing the produced gas into the soil below the casing. For some purposes the gas may be produced outside of the casing 1 and in that event the casing 13 or the bulb 27 may be connected with a suitable source of gas supply and the operation following such connection would be the same as if the gas was produced inside the casing 1.

Where it is desired to collect the gas from a given area of soil the fan 15 would be rotated opposite in direction to that when it is desired to force a fluid into the soil.

The lower end 7 and branch 8 of the distributing pipe 6 being arranged opposite the windows 3 as air is pumped into the casing 1, the windows 3 are kept free from the deposit which would occur where combustion was going on in the casing 1 for the purpose of producing a gas. In case the glass or other transparent material used for closing the openings in the wall of the casing 1 becomes discolored by reason of the arrangement described the glass may be readily cleaned.

Having thus fully described my invention what I claim and desire to secure by Letters Patent is:

1. An exterminator comprising a casing adapted to contain a gas, a window formed in said casing, a pipe for introducing fluid under pressure into said casing, said pipe extending into said casing and having the exterior portion thereof disposed adjacent to said window whereby said fluid under pressure may be directed against said window for the purpose described.

2. An exterminator comprising a casing adapted to contain a gas, a plurality of windows formed in said casing, a pipe for introducing fluid pressure into said casing, after having the inner portion thereof formed with a plurality of branch pipes, said branch pipes having the exit ends thereof disposed adjacent said windows whereby the fluid pressure is directed in said windows for the purpose described.

In testimony whereof I have signed my name to this specification in the presence of two subscribing witnesses.

JULIO CONCEIÇÃO.

Copies of this patent may be obtained for five cents each, by addressing the "Commissioner of Patents, Washington, D. C."